US011022176B2

(12) United States Patent
Delaby et al.

(10) Patent No.: US 11,022,176 B2
(45) Date of Patent: Jun. 1, 2021

(54) SLEWING BEARING WITH SEALING ARRANGEMENT

(71) Applicant: Aktiebolaget SKF, Gothenburg (SE)

(72) Inventors: Juliette Delaby, Charentenay (FR); Christian Kogler, Oberkurzheim (AT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/286,849

(22) Filed: Feb. 27, 2019

(65) Prior Publication Data

US 2019/0323554 A1  Oct. 24, 2019

(30) Foreign Application Priority Data

Apr. 24, 2018  (DE) .......................... 102018206244.7
Aug. 8, 2018  (DE) .......................... 102018213357.3

(51) Int. Cl.
*F16C 33/78* (2006.01)
*F16C 19/18* (2006.01)

(52) U.S. Cl.
CPC .......... *F16C 33/7896* (2013.01); *F16C 19/18* (2013.01); *F16C 33/783* (2013.01); *F16C 33/7823* (2013.01); *F16C 33/7866* (2013.01); *F16C 2300/14* (2013.01)

(58) Field of Classification Search
CPC .............. F16C 33/7896; F16C 33/7886; F16C 33/7876; F16C 33/7879; F16C 33/7866; F16C 33/7859; F16C 33/784; F16C 33/783; F16C 33/7823; F16C 33/782; F16C 33/7816; F16C 33/72; F16C 2300/14; F16J 15/3248; F16J 15/3252; F16J 15/3268; F16J 15/32; F16J 15/3204; F16J 15/3216; F16J 15/322

See application file for complete search history.

(56) References Cited

U.S. PATENT DOCUMENTS 2,945,730 A   7/1960  Murray
3,902,726 A   9/1975  Hisada
4,770,424 A   9/1988  Otto
(Continued)

FOREIGN PATENT DOCUMENTS

CN   204253631 U   4/2015
CN   204327768 U   5/2015
(Continued)

OTHER PUBLICATIONS

Machine Translation of WO 2018185288.
Machine Translation of DE 102011011165.

*Primary Examiner* — James Pilkington
(74) *Attorney, Agent, or Firm* — Garcia-Zamor Intellectual Property Law; Ruy Garcia-Zamor; Bryan Peckijian

(57) ABSTRACT

A slewing bearing including a first ring, a second ring, the first and second rings being in relative rotation around a rotation axis, at least one row of rolling elements arranged between the rings, and at least two seals having each an annular heel mounted on a cylindrical frontal surface of first ring, and an oblique sealing lip in sliding frictional contact with part of the second ring. The slewing bearing further includes a guiding ring axially arranged between the two seals. The guiding ring provides a flange that prevents the reversion of one sealing lip, and an annular axial collar that radially blocks the annular heel of the other seal in a radial outwards direction.

8 Claims, 2 Drawing Sheets

(56) References Cited

U.S. PATENT DOCUMENTS

| | | |
|---|---|---|
| 4,787,758 A | 11/1988 | Jacob |
| 5,908,249 A | 6/1999 | Nisley |
| 8,212,372 B2 | 7/2012 | Fujioka |
| 9,022,663 B2 | 5/2015 | Palmer |
| 9,334,901 B2 | 5/2016 | Schroppel et al. |
| 9,644,679 B2 | 5/2017 | Delaby |
| 9,751,576 B2 | 9/2017 | Suzuki |
| 9,810,266 B2 | 11/2017 | Capoldi |
| 2002/0126926 A1 | 9/2002 | Ohtsuki |
| 2004/0228556 A1 | 11/2004 | Ohtsuki |
| 2012/0098209 A1 | 4/2012 | Siegfriedsen |
| 2013/0039611 A1* | 2/2013 | Russ ............... F16C 19/381 384/486 |
| 2015/0267061 A1 | 9/2015 | Huesmann |
| 2016/0059950 A1 | 3/2016 | Kortelainen |
| 2016/0108966 A1 | 4/2016 | Krebs |
| 2016/0265594 A1 | 9/2016 | Capoldi |
| 2016/0327097 A1 | 11/2016 | Russ |
| 2016/0341316 A1* | 11/2016 | Baumann ............ F16J 15/3216 |
| 2019/0323551 A1 | 10/2019 | Delaby |
| 2019/0323559 A1 | 10/2019 | Delaby et al. |

FOREIGN PATENT DOCUMENTS

| | | |
|---|---|---|
| CN | 204692541 U | 10/2015 |
| CN | 105464882 A | 6/2016 |
| CN | 207122580 U | 3/2018 |
| CN | 108278275 A | 7/2018 |
| DE | 10259400 A1 | 7/2004 |
| DE | 102011011165 A1 | 8/2012 |
| DE | 102015217561 A1 | 3/2017 |
| EP | 0458122 A2 | 11/1991 |
| EP | 2722544 A1 | 4/2014 |
| EP | 2993123 A1 | 3/2016 |
| EP | 3048319 A1 | 7/2016 |
| FR | 2595776 A1 | 9/1987 |
| FR | 2694610 A1 | 2/1994 |
| FR | 3025008 B1 | 9/2016 |
| GB | 2213882 A | 8/1989 |
| GB | 2554688 A | 4/2018 |
| JP | 2011007272 A | 1/2011 |
| JP | 2012081891 A | 4/2012 |
| JP | 2016014446 A | 1/2016 |
| JP | 2017053368 A | 3/2017 |
| WO | 2018185288 A1 | 10/2018 |

* cited by examiner

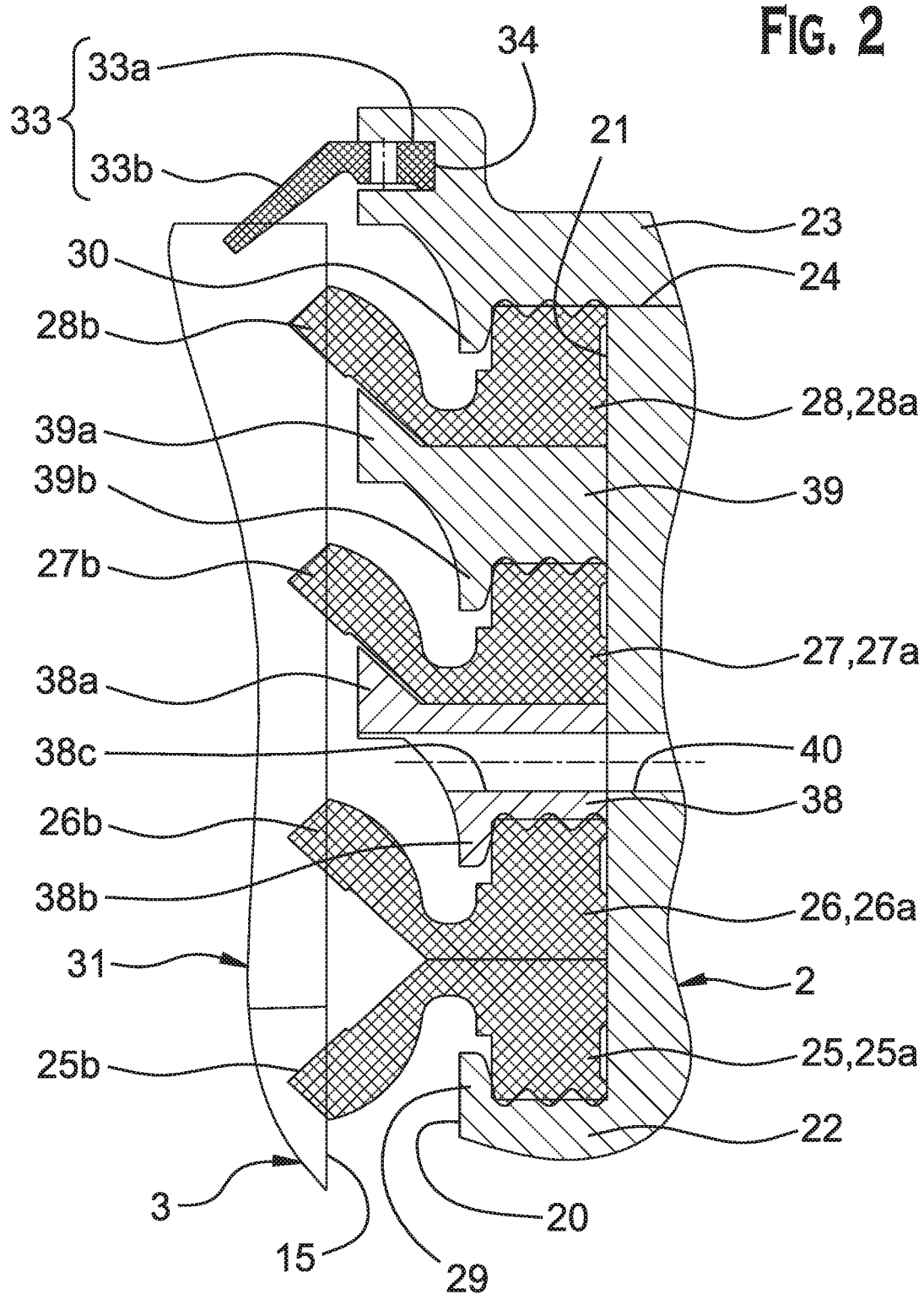

SLEWING BEARING WITH SEALING ARRANGEMENT

CROSS-REFERENCE

This application claims priority to German patent application no. 102018206244.7 filed on Apr. 24, 2018 and to German patent application no 102018213357.3 filed on Aug. 8, 2018, the contents of which are both fully incorporated herein by reference.

TECHNOLOGICAL FIELD

The invention relates to the field of roller bearings. More particularly, the invention relates to the slewing bearings of large diameter for use in marine applications, for example a tidal power station.

BACKGROUND

Such bearings generally comprise an inner ring, an outer ring, and seals disposed between the rings to define a closed annular space within which at least one row of rolling elements, such as balls or rollers, is arranged between the rings.

Slewing bearings are used in aggressive environments, in particular in marine applications. Seals prevent exterior elements, such as dust, abrasive particles, water, and marine species, for example plankton and algae, from getting inside the bearing and damaging its components. Particles mays also go inside the seal itself, and then reduce the seal service life.

Typically, seals are fixed to one of the rings and comprise a sealing lip in sliding contact with the other ring. Generally, a plurality of adjacent seals are provided on bearing front side that is directly in contact with water. Advantageously, the lips of adjacent seals may be oriented in different directions.

However, the sealing of such bearings, realized in this way, may be insufficient particularly for use in a submersible machine. Indeed, the first seal is only the first damaged before the others. The more seals, the more expensive the slewing bearing. The total weight of such sealed bearings is increased, that could be a drawback for some applications.

Another disadvantage is that the seal cannot be changed under water. Such maintenance operations are expensive and require the submersible machine to be shut down frequently and for a long period of time.

It is therefore desirable that a slewing bearing comprises effective sealing elements that prevent the entry of exterior element, of increased service life, particularly in aggressive environment, and easy to implement.

SUMMARY

The aim of the invention is to solve the above difficulties.

To this end, the invention relates to a slewing bearing comprising a first ring, a second ring, the rings being in relative rotation around a rotation axis, and at least one row of rolling elements arranged between the rings. The slewing bearing comprises at least two seals having each an annular heel mounted on a cylindrical frontal surface of first ring, and an oblique sealing lip in sliding frictional contact with part of the second ring.

According to the invention, the slewing bearing further comprises a guiding ring axially arranged between the two seals. The guiding ring comprises a flange that radially outwardly projects towards the second ring, the flange extending obliquely with a support surface inclined in the same direction as the sealing lip of one of the seals. The guiding ring further comprises an annular axial collar that radially blocks the annular heel of the other seal in a radial outwards direction.

According to further aspects of the invention which are advantageous but not compulsory, such a slewing bearing may incorporate one or several of the following features:

The heels are mounted into a circumferential groove provided to the first ring, and open radially towards the second ring, the groove being axially bounded on a downward axial side by a shoulder.

The shoulder is provided with an annular axial collar that radially blocks the annular heel of the seal adjacent to the shoulder.

The slewing bearing comprises an annular cap fixed to a lateral surface of first ring, bounding the circumferential groove on an upward axial side.

The cap is provided with an annular axial collar that radially blocks the annular heel of the seal adjacent to the cap.

The second ring is provided with a sealing contact member having a peripheral surface onto which at least one of the sealing lips are in sliding frictional contact, the sealing contact member being fixed to a lateral surface of second ring.

The cap is provided with a sealing member having a sealing lip in sliding frictional contact with the second ring or the sealing contact member.

The sealing contact member is fixed to the second ring by a plurality of screws, screws.

The cap is fixed to the first ring by a plurality of screws. Screws are covered by mastic.

The guiding ring is provided with a through hole that radially opens on one side towards the second ring, and on the opposite side towards a leakage channel provided through the first ring, the leakage channel radially opening to the bottom surface of circumferential groove.

The channel is provided with sensors to detect pollution and warn.

The first ring is an outer ring and the second ring is an inner ring.

Slewing bearing comprises at least one row of rolling elements arranged between the first and second rings to form an axial thrust.

Slewing bearing comprises at least one row of rolling elements arranged between the first and second rings to form a radial thrust.

Rolling elements are balls.

Rolling elements are rollers.

Rolling elements are circumferentially maintained by a cage.

Rolling elements are circumferentially maintained by spacers.

BRIEF DESCRIPTION OF THE DRAWINGS

The invention will now be explained in correspondence with the annexed figures, as illustrative examples, without restricting the object of the invention. In the annexed figures:

FIG. 2 is a detailed view in axial section of the slewing bearing of FIG. 1.

DETAILED DESCRIPTION

Figure 1:
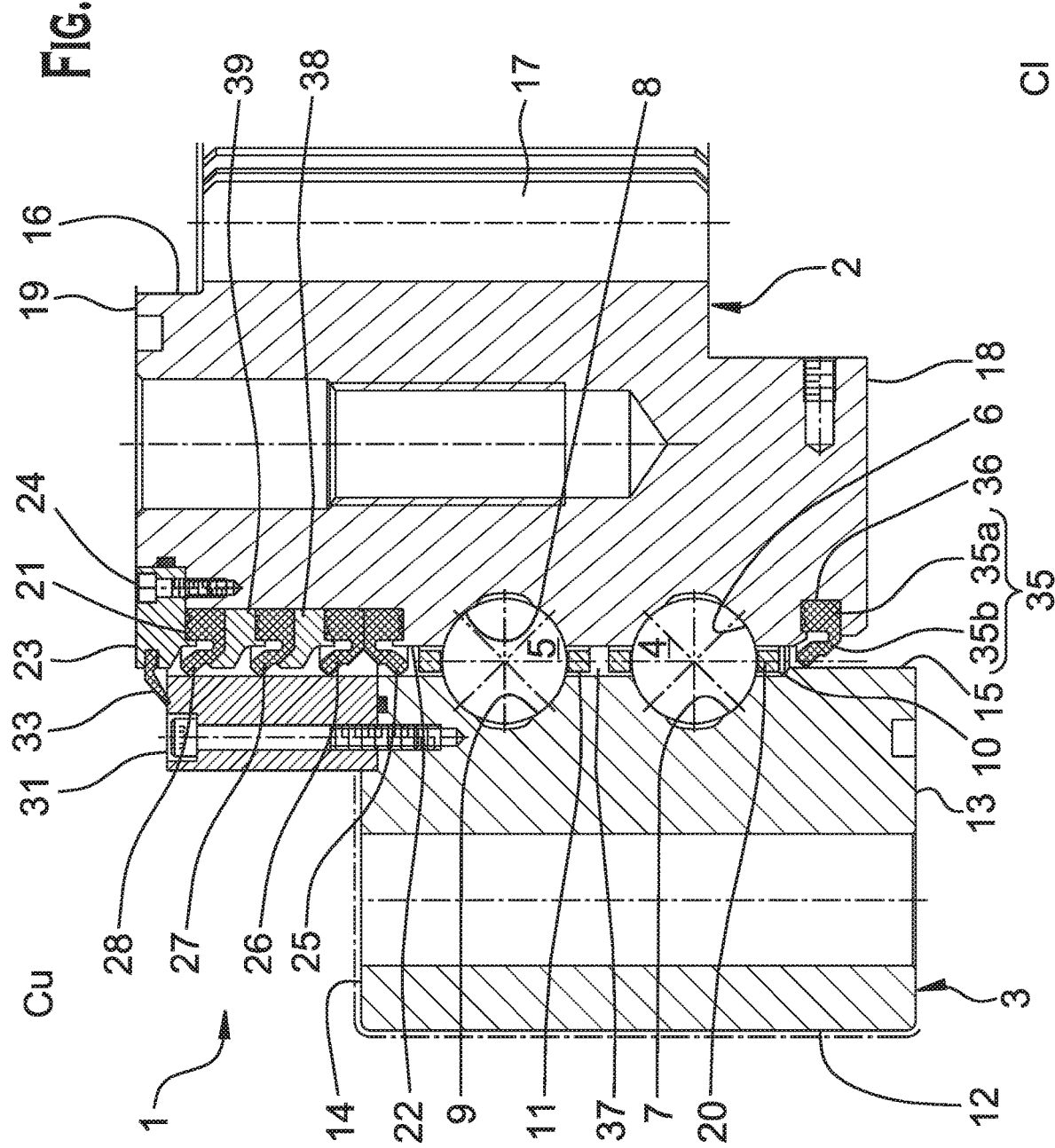
FIG. 1 is a partial view in axial section of a slewing bearing according to the invention.

FIG. 1 shows a slewing roller bearing, which bears the overall reference 1, with a large diameter which can be used in particular in marine applications, for example a tidal power station. The slewing bearing defines an upper side Cu directly exposed to the marine environment, and a lower side Cl arranged in a chassis (not illustrated).

The slewing roller bearing 1 comprises an inner ring 2, an outer ring 3, two rows of rolling elements 4, 5 arranged between these rings 2, 3 in order to form a radial thrust which can transmit radial forces.

The rolling elements 4, 5 are balls in the illustrated embodiment. The rolling elements may be of any other suitable type for the application, for example rollers. The first row of balls 4 are engaged in ring raceways 6, 7 provided on an axially extending radial facing first ring surface of inner ring 2 and an axially extending radial second ring surface of outer ring 3, respectively. The second row of balls 5 are engaged in ring raceways 8, 9 provided on the axially extending radial facing surfaces inner ring 2 and outer ring 3, respectively.

The balls 4 of first row are arranged in a first cage 10 for maintaining the regular circumferential spacing of the balls. The balls 5 of second row are arranged in a second cage 11 for maintaining the regular circumferential spacing of the balls. Alternatively, the rolling elements may be circumferentially equally spaced by a plurality of intermediate spacers.

As an alternate not shown, the slewing bearing may also comprise at least one row of rolling elements, for example rollers, arranged between the inner and outer rings to form an axial thrust which can transmit axial forces. An example of such bearing is described in FR-A1-2 694 610.

The inner ring 2 and the outer ring 3 are in the form of concentric rings being rotatable around a rotation axis (not illustrated) of the bearing 1, the outer ring 3 surrounding at a radial distance the inner ring 2.

The rings 2, 3 are of solid type. A "solid type" is understood to mean a ring of which the shape is obtained by machining with the removal of chips (turning, grinding) from tubes, bars, and forged and/or rolled blanks. The rings 2, 3 are form in one piece, but alternatively may comprise several ring parts assembled together.

The outer ring 3 comprises an outer frontal surface 12 bounded axially by a lower lateral surface 13 on lower side Cl, and an upper lateral surface 14 on upper side Cu of slewing bearing 1. The lateral surfaces 13, 14 are axially opposite one to the other. When viewed in cross-section the lateral surface appears as a radially extending axial facing second ring surface of the outer ring. The outer ring 3 also comprises a bore 15. The bore 15 is stepped and is provided with two grooves 7, 9 radially open to the inner ring 2. The grooves 7, 9 are the ring raceways for the first row of balls 4 and the second row of balls 5, respectively.

Advantageously, the outer surfaces 12 and 14 of outer ring 3 are covered by a corrosion surface protective treatment.

The inner ring 2 comprises a bore 16 provided with a plurality of radial teeth 17 that are intended to mesh with gearwheels (not illustrated) in order to orient a mobile element. The bore 16 is bounded axially by a lower lateral surface 18 on lower side Cl, and an upper lateral surface 19 on upper side Cu of slewing bearing 1. The lateral surfaces 18, 19 are axially opposite one to the other.

The inner ring 2 also comprises an outer frontal surface 20. The outer surface 20 is stepped and is provided with two grooves 6, 8 radially open to the outer ring 3 are formed. The grooves 6, 8 are the ring raceways for the first row of balls 4 and the second row of balls 5, respectively.

The outer frontal surface 20 is further provided with a circumferential groove 21 open radially towards the outer ring 3. The groove is axially bounded between a shoulder 22 towards the lower side Cl, and a cap 23 towards the upper side Cu of bearing 1. The shoulder 22 is formed when removing material on the outer frontal surface 20 of inner ring 2.

The cap 23 is fixed to the inner ring 2 by fixing means. Upper lateral surface 19 is provided with a circumferential recess 24 wherein the cap 23 is arranged. In the illustrated embodiment, the circumferential recess 24 is provided circumferentially with a plurality of axial threaded holes (not referenced). The cap 23 is provided with a plurality of axial through holes (not referenced), each of the holes axially facing a corresponding threaded hole. The cap 23 is fixed to the inner ring 2 by a plurality of screws (not referenced) extending through the cap holes and engaged with the threaded holes of inner ring 2. Advantageously, the heads of screws are covered by mastic in order to resist to the subsea environment. Alternatively, the cap 23 may be fixed to the inner ring 2 by any other suitable means.

The cap 23 is annular. Alternatively, the cap 23 may comprise a plurality of circumferentially adjacent cap parts.

Upper seals 25, 26, 27, 28 are mounted in the circumferential groove 21. In the illustrated embodiment of FIG. 2, the inner ring 2 is provided with four upper seals. Alternatively, the inner ring 2 may comprise two, or more than two upper seals. The seals 25, 26, 27, 28 may be made of elastomeric material, for example nitrile rubber. The seals 25, 26, 27, 28 are intended to limit the infiltration of liquids, particles and dust from the subsea environment between the inner ring 2 and the outer ring 3.

Upper seals 25, 26, 27, 28 are each provided with an annular heel 25a, 26a, 27a, 28a mounted in the groove 21, and a sealing lip 25b, 26b, 27b, 28b that radially outwardly extends from the heel towards the outer ring 3.

The shoulder 22 is provided with an annular axial collar 29 that radially blocks the annular heel 25a of the lowermost seal 25 in a radially outwards direction. The cap 23 is also provided with an annular axial collar 30 that radially blocks the annular heel 28a of the uppermost seal 28 in a radially outwards direction.

The sealing lips 25b, 26b, 27b, 28b project radially outwardly offset with respect to the outer frontal surface 20 of inner ring 2 in which the circumferential groove 21 is formed. Furthermore, the sealing lips 25b, 26b, 27b, 28b project radially outwardly offset with respect to the cap 23. The sealing lips 25b, 26b, 27b, 28b are flexible in the radial direction. Advantageously, the sealing lips 25b, 26b, 27b, 28b extend obliquely with respect to a radial plane. Advantageously, the lowermost seal 25 is provided with a sealing lip 25b that is oriented opposite to that of the other uppermost seals 26, 27, 28.

The sealing lip 25b is elastically deformed and in sliding contact with an axially extending radial contact member surface provided to the bore 15 of outer ring 3. The peripheral surface of the sealing contact member is flush with the axially extending radial facing second ring surface of the outer ring 3.

The sealing lips 26b, 27b, 28b are elastically deformed and in sliding contact with a peripheral sliding contact surface provided to the bore 32 of an annular sealing contact member 31 mounted onto the upper radially extending axial facing second ring surface 14 of outer ring 3. In the illustrated embodiment, the upper radially extending axial facing second ring surface 14 is provided circumferentially with a plurality of axial threaded holes (not referenced). The sealing contact member 31 is provided with a plurality of axial through holes (not referenced), each of the holes axially facing a corresponding threaded hole. The sealing contact member 31 is fixed to the outer ring 3 by a plurality of screws (not referenced) extending through the cap holes and engaged with the threaded holes of outer ring 3 at an axial end of the seal contact member. Advantageously, the heads of screws are covered by mastic in order to resist to the subsea environment. Alternatively, the axial end of the sealing contact member 31 may be fixed to the outer ring 3 by any other suitable means.

The sealing contact member 31 is annular. Alternatively, the sealing contact member 31 may comprise a plurality of circumferentially adjacent parts. Alternatively, the sealing lips 26b, 27b, 28b are elastically deformed and in sliding contact with a sealing contact surface provided to the bore 15 of the outer ring 3. Alternatively, the sealing 25b is elastically deformed and in sliding contact with the sealing contact member 31.

The sealing lips 25b, 26b, 27b 28b provide a dynamic sealing function with the outer ring 3. The expression "dynamic sealing" is understood to mean sealing between two parts that move relative to the other. The lips 26b, 27b, 28b come into sliding frictional contact with a sealing contact surface of the sealing contact member 31 mounted to the outer ring 3, and the lip 25b come into a frictional contact with a sealing contact surface provided to the bore 15 of outer ring 3. The lips thus have an area of contact with the outer ring 3 and the sealing contact member 31 securely fixed to the outer ring 3. The frictional contact between the lips and the sealing contact surfaces are radial.

The free ends of lips advantageously have a triangular shape in cross section in order to limit the friction between the seals 25, 26, 27, 28 and the outer ring 3 and the sealing contact member 31.

Advantageously, the cap 23 is further provided with a cap sealing member 33. The cap sealing member 33 comprises an annular heel 33a mounted in an annular slot 34 formed in a bore of cap 23, and a sealing lip 33b projecting radially inwardly towards the outer ring 3. The sealing lip 33b has a free end in sliding frictional contact with a sealing contact surface provided to an upper surface of sealing contact member 31. The sealing lip 33b provide a dynamic sealing function with the sealing contact member 31 fixed to the outer ring 3. The contact between the sealing lip 33b and the member 31 is axial in this case.

The slewing bearing 1 further comprises a lower seal 35 on lower side Cl. The lower seal 35 is axially opposite to upper seals 25, 26, 27, 28 and to the cap sealing member 33. The inner seal 35 comprises an annular heel 35a mounted in an annular slot 36 formed in the outer surface 20 of inner ring 2, and a sealing lip 35b projecting radially inwardly towards the outer ring 3. The sealing lip 35b has a free end in sliding frictional contact with a sealing contact surface provided to the bore 15 of outer ring 3. The contact between the sealing lip 35b and the outer ring 2 is radial in this case. Alternatively, the lower seal 35 may be mounted in the outer ring 3.

The seals 25 and 35 define an annular closed chamber 37 between the inner ring 2 and the outer ring 3 within which the rows of balls 4, 5 are arranged. Advantageously, the closed annular chamber 37 is provided with lubricant. The innermost seal 25 permits to prevent grease leakage. The two outermost seals 27, 28 prevent the intrusion of external contaminating particles, dust, and liquids. The intermediate seal 26 forms a back-up seal in case of damage on one of the seals 25, 27, 28.

According to the invention, a first and a second guiding rings 38, 39 are arranged in the circumferential groove 21. The guiding rings 38, 39 are annular. The first guiding ring 38 is axially mounted between the annular heels 26a, 27a of seals 26, 27, respectively. The second guiding ring 39 is axially mounted between the annular heels 27a, 28a of seals 27, 28, respectively.

In the embodiment illustrated in FIG. 1, the two guiding rings 38, 39 are similar.

The first guiding ring 38 comprises a flange 38a that radially outwardly projects towards the outer ring 3. The flange 38a extends obliquely and is provided with a support surface inclined in the same direction as the sealing lip 27b of the third upper seal 27 in order to prevent any reversion of the sealing lip 27.

The guiding ring 38 further comprises an annular axial collar 38b that radially block the annular heel 26a of a second upper seal 26 in a radial outwards direction. The heels 25a, 26a of the axially adjacent seals 25, 26 are axially maintained between the shoulder 22 provided to the outer surface 20 of inner ring 2 and the guiding ring 38. Furthermore, the heel 25a is radially maintained between the axial collar 29 and the bottom surface of groove 21 of inner ring 2, and the heel 25b is radially maintained between the axial collar 38b of guiding ring 38 and the bottom surface of groove 21 of inner ring 2.

The second guiding ring 39 comprises a flange 39a that radially outwardly projects towards the outer ring 3. The flange 39a extends obliquely and is provided with a support surface inclined in the same direction as the sealing lip 28b of the uppermost seal 28 in order to prevent any reversion of the sealing lip 28.

The guiding ring 39 further comprises an annular axial collar 39b that radially block the annular heel 27a of a third upper seal 27 in a radial outwards direction. The heel 27a of seal 27 is axially maintained between the first and second guiding rings 38, 39. Furthermore, the heel 27a is radially maintained between the axial collar 39b of second guiding ring 39 and the bottom surface of groove 21 of inner ring 2. The heel 28a of seal 28 is axially maintained between the second guiding ring 39 and the cap 23. Furthermore, the heel 28a is radially maintained between the axial collar 30 of cap 23 and the bottom surface of groove 21 of inner ring 2.

The sealing assembly formed by the cap 23, the seals 25, 26, 27, 28, and the guiding rings 38, 39 are maintained axially and radially with respect to the inner ring 2. Moreover, these elements are easy to be axially installed during assembly of the slewing bearing. These elements are also easy to be removed and replaced by new elements during a maintenance operation.

Alternatively, the slewing bearing 1 may comprise only the three seals 25, 26, 27 and one guiding ring 38. Alternatively, the slewing bearing 1 may comprise more than four seals, guiding rings being provided between two adjacent seals with oblique lips having the same orientation.

In the embodiment illustrated in FIG. 2, the first guiding ring 38 is further provided with a through hole 38c. The through hole 38c is radially open on one side towards the outer ring 3, and on the opposite side towards a leakage channel 40 provided through the inner ring 2. The leakage channel 40 radially opens to the bottom surface of groove 21 provided to the outer surface 20 of inner ring 2. The channel defined by the leakage channel connected to the through holes 38c is open between the seals 26 and 27. The entry of pollution in this channel indicates that the seals 27 and 28 are worn and do not ensure their sealing function anymore. A maintenance operation of the slewing bearing 1 is then necessary. The channel 40 may be provided with sensors to detect such pollution and warn.

This invention provides a slewing bearing that is able to ensure the relative rotation between a first ring and a second ring, the bearing having improved sealing by virtue of the use of sealing means comprising the upper seals mounted and the guiding rings mounted on one of the rings. Such sealing means are able to seal the space between the first and second rings by sliding frictional seal in order to limit the intrusion of contaminating particles and liquids in the direction of rolling elements and guarantees a longer service life.

What is claimed is:

1. A slewing bearing comprising:
    a first ring,
    a second ring, the first ring and the second ring being in relative rotation around a rotational axis and radially spaced from each other, the second ring having an axially extending radially facing second ring surface on a side of the second ring which defines a raceway and a radially extending axially facing second ring surface,
    a plurality of rolling elements arranged between the first and second rings,
    at least three seals having an annular heel mounted on a cylindrical frontal surface of the first ring, wherein a first seal of the at least three seals has an oblique sealing lip in sliding frictional contact with part of the second ring, and
    a sealing contact member having an axially extending radially facing contact member surface onto which a second and third seal of the at least three seals each have an oblique sealing lip are in sliding frictional contact, the sealing contact member being fixed on the radially extending axially facing second ring surface, the sealing contact member having a first radially extending axially facing contact member surface, the first radially extending axially facing contact member surface defines an axial end that contacts the radially extending axially facing second ring surface, the radially axially facing radially facing contact member surface being arranged so that it is flush with the axially extending radially facing second ring surface,
    wherein
    the slewing bearing further comprises a guiding ring axially arranged between the second and third seals and comprising:
        a flange that radially outwardly projects towards the second ring, the flange extending obliquely with a support surface inclined in the same direction as the sealing lip of one of the second or third seal, and
        an annular axial collar that is located radially adjacent to the annular heel of the other one of the second or third seal.

2. The slewing bearing according to the claim 1, wherein the annular heel of each of the at least three seals is mounted into a circumferential groove provided on the first ring that opens radially towards the second ring, the groove being axially bounded on a first axial side by a shoulder such that the shoulder is located axially between the at least three seals and the plurality of rolling elements.

3. The slewing bearing according to the claim 2, wherein the shoulder is provided with an annular axial collar that radially blocks the annular heel of the first seal.

4. The slewing bearing according to claim 2, wherein the slewing bearing further comprises an annular cap fixed to a lateral surface of first ring, the annular cap bounding the circumferential groove on a second axial side, which is opposite from the first axial side.

5. The slewing bearing according to the claim 4, wherein the annular cap is provided with an annular axial collar that radially blocks the annular heel of the second or third seal which is adjacent to the cap.

6. The slewing bearing according to claim 2, wherein the slewing bearing further comprises an annular cap fixed to a lateral surface of first ring, the annular cap bounding the circumferential groove on a second axial side, which is opposite from the first axial side, wherein the annular cap is provided with a sealing member having a sealing lip in sliding frictional contact with a second radially extending axial contact member surface of the sealing contact member.

7. The slewing bearing according to claim 2, wherein the guiding ring is provided with a through hole that radially opens on one side towards the second ring and on the opposite side towards a leakage channel provided through the first ring, the leakage channel radially opening to a bottom surface of the circumferential groove.

8. The slewing bearing according to the claim 7, wherein the leakage channel is provided with sensors to detect pollution.

* * * * *